United States Patent [19]

Takano

[11] Patent Number: 4,571,217
[45] Date of Patent: Feb. 18, 1986

[54] VARIABLE PULLEY STRUCTURE

[75] Inventor: Hiroshi Takano, Miki, Japan

[73] Assignee: Mitsuboshi Belting Ltd., Kobe, Japan

[21] Appl. No.: 705,851

[22] Filed: Feb. 26, 1985

Related U.S. Application Data

[63] Continuation of Ser. No. 318,357, Nov. 5, 1981, abandoned.

[30] Foreign Application Priority Data

Nov. 5, 1980 [JP] Japan ............................. 55-156117
Jan. 17, 1981 [JP] Japan ............................... 56-4789

[51] Int. Cl.⁴ ..................... F16H 55/56; F16H 57/04; F16F 1/14
[52] U.S. Cl. .......................... 474/46; 474/43; 267/58
[58] Field of Search ................. 474/43, 44, 45, 46; 267/58, 179, 155, 154, 157

[56] References Cited

U.S. PATENT DOCUMENTS

| | | | |
|---|---|---|---|
| 1,377,138 | 5/1921 | Morrison | 267/155 |
| 2,203,095 | 6/1940 | Kreissig et al. | 267/58 |
| 2,607,235 | 8/1952 | Ruegenberg | 474/46 |
| 2,746,816 | 5/1956 | Michie et al. | 474/45 |
| 2,850,913 | 9/1958 | Lewellen et al. | 474/45 |
| 3,010,333 | 11/1961 | Rampe | 474/46 |
| 3,122,384 | 2/1964 | Luenberger | 474/44 |
| 3,177,734 | 4/1965 | Rackelboom | 474/46 |
| 3,250,553 | 5/1966 | Detwiler | 474/46 |
| 3,252,346 | 5/1966 | Prior | 474/44 |
| 3,383,934 | 7/1966 | Flynn | 474/44 |
| 3,386,300 | 6/1968 | Maurey et al. | 474/44 |
| 3,516,295 | 6/1970 | Benz et al. | 474/45 |
| 3,574,366 | 4/1971 | Thostenson | 474/43 |
| 3,618,415 | 11/1971 | Ruprecht et al. | 474/44 |
| 3,709,051 | 1/1973 | Boissin | 474/46 |
| 3,739,651 | 6/1973 | Lewis | 474/46 |
| 3,811,331 | 5/1974 | Moogk | 474/44 |
| 4,033,195 | 7/1977 | Takagi et al. | 474/46 |
| 4,149,425 | 4/1979 | Williams | 474/46 |
| 4,173,155 | 11/1979 | Togami et al. | 474/45 |
| 4,310,321 | 1/1982 | Peter et al. | 474/46 |

FOREIGN PATENT DOCUMENTS 35421 8/1977 Japan.

Primary Examiner—Lawrence J. Staab
Assistant Examiner—Michael D. Bednarek
Attorney, Agent, or Firm—Wood, Dalton, Phillips, Mason & Rowe

[57] ABSTRACT

A variable pulley structure (10) arranged to be mounted to a shaft (17) with at least one of the sideplate elements (14) thereof movably mounted to the shaft for both axial and rotational movement. Disposition of the movable sideplate element (14) is controlled by a spring (26) extending between a spring retainer (22) fixed to the shaft (17) and a portion (24) of the sideplate element. The spring (26) is retained at its opposite ends to the retainer and sideplate element, respectively, suitably to be unwound as a result of increased torque developed in the movable sideplate element (14) by the drive system. The ends (29,30) of the spring (26) are releasably connected to the retainer and movable sideplate element as by reception in arcuate grooves (27,28) therein, by abutment with suitable stop shoulders (131,132) thereon, etc. Cross section of the spring, in one form, is round and in another form for use in transmitting high load torques, is rectangular.

14 Claims, 20 Drawing Figures

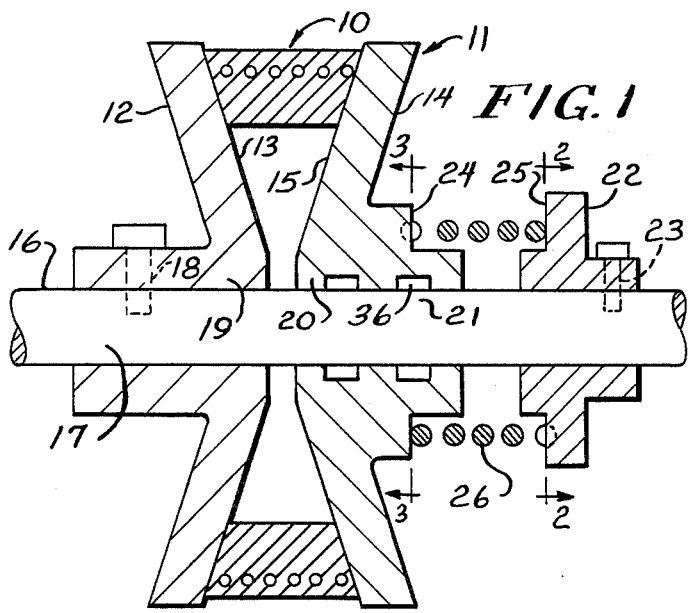
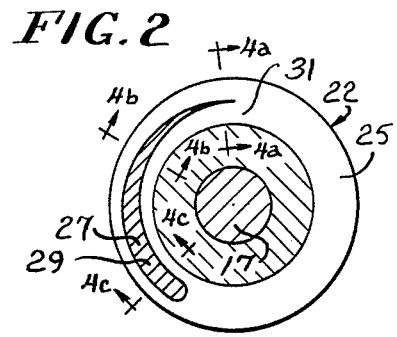
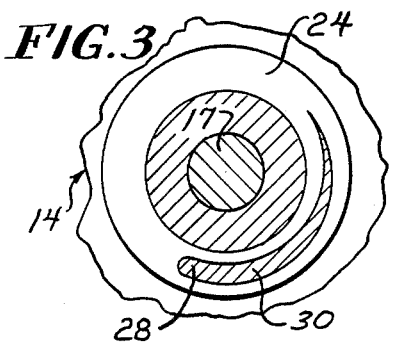
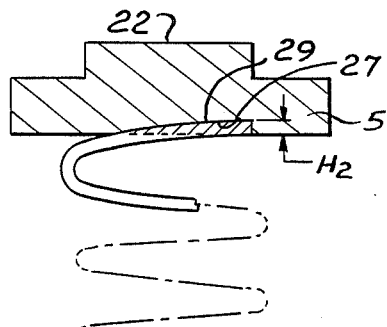
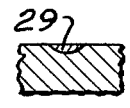
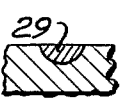
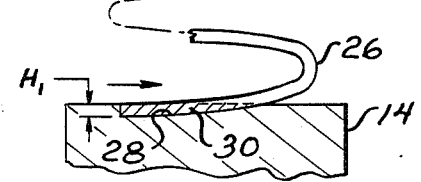
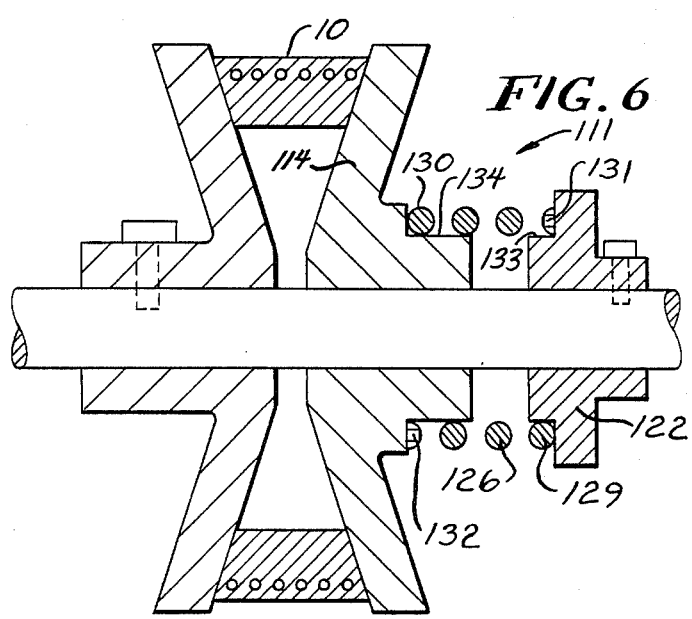

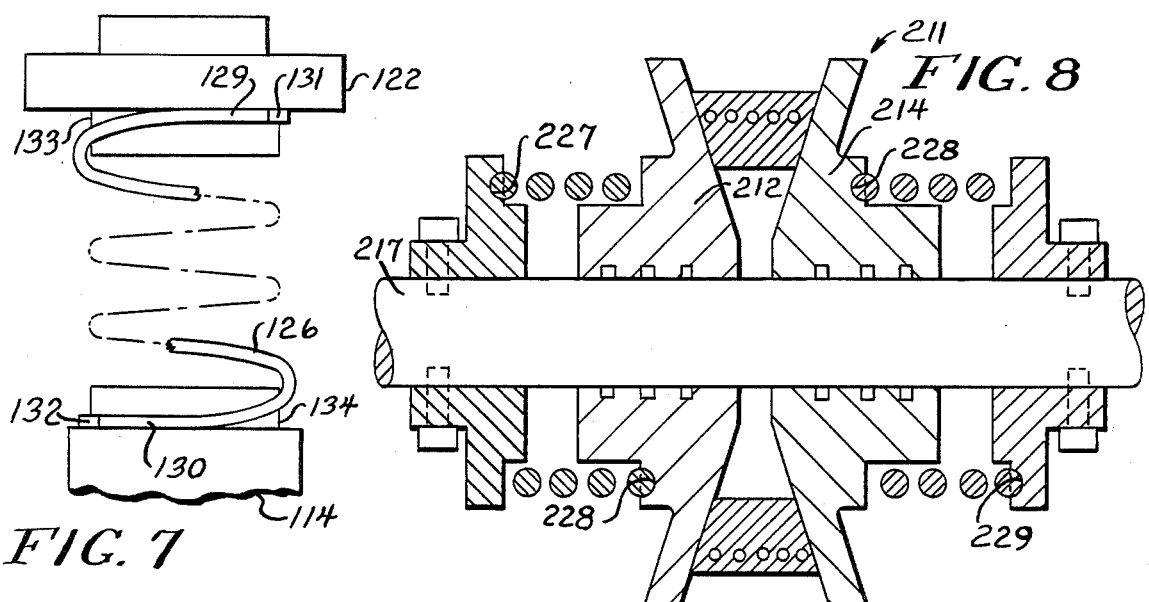
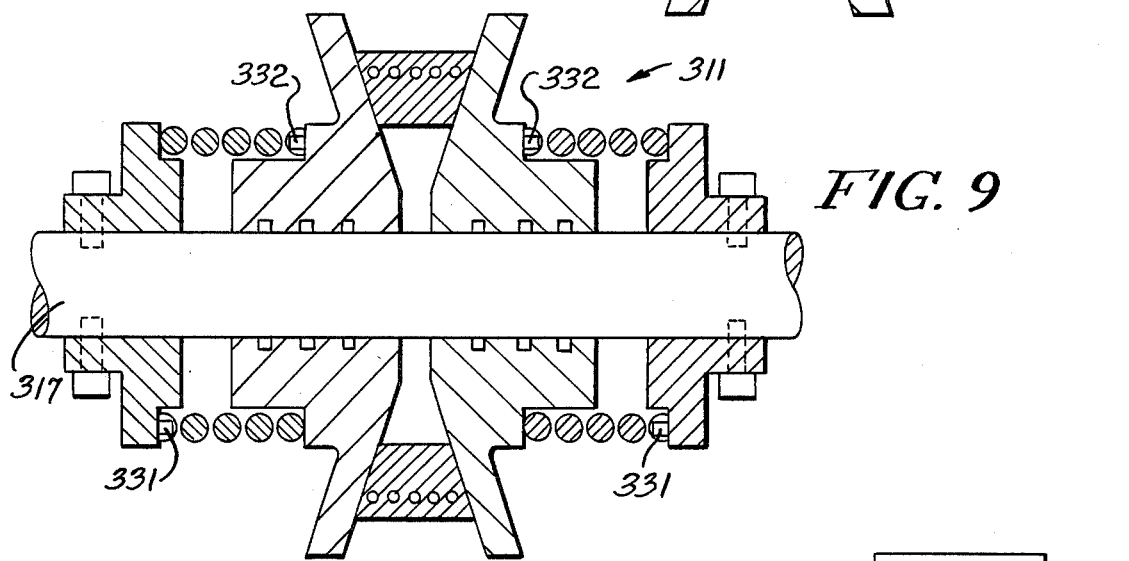
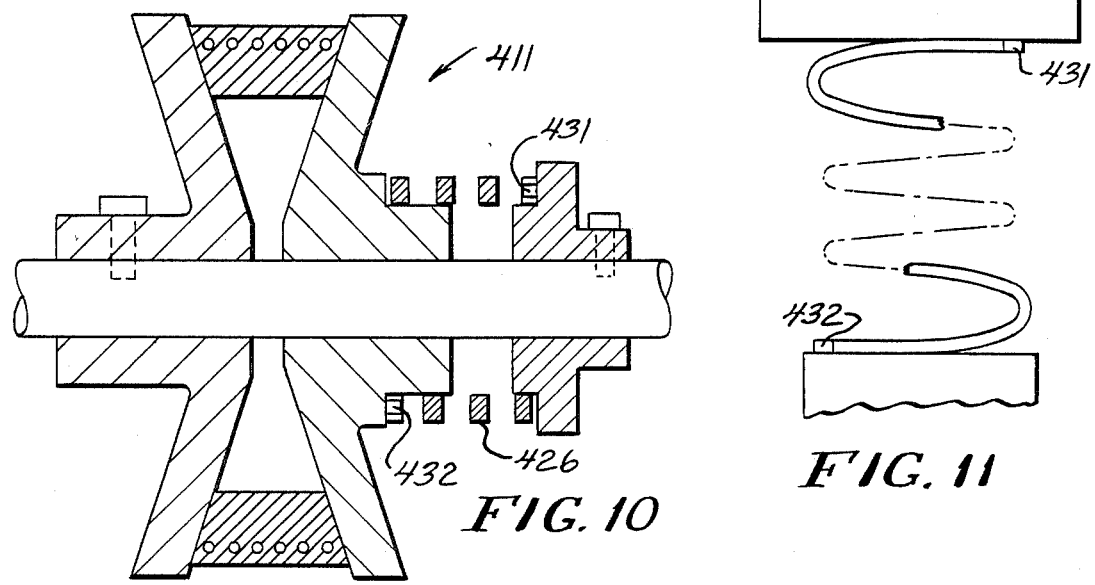

VARIABLE PULLEY STRUCTURE

This application is a continuation of application Ser. No. 318,357 filed Nov. 5, 1981, now abandoned.

BACKGROUND OF THE INVENTION

1. Field of the Invention

This invention relates to drive pulleys, and in particular to variable drive pulleys.

2. Description of the Background Art

In one conventional form of variable pulley known in the art, a pair of sideplates defining confronting conical belt-engaging surfaces are mounted to a shaft by splines, or keyways. At least one of the sideplates is movable along the shaft to provide a variable spacing between the conical belt-engaging surfaces, thereby to provide the variable drive. The provision of the splines, or keyways, has presented manufacturing problems in that such manufacture has required expensive materials and high manufacturing costs. Additionally, such pulley construction has had the serious disadvantage of high stress produced in the splines and keyways. Such stress has caused substantial wear and heating of the structure resulting in increased sliding resistance and shortened useful life of the structure.

In one prior art variable pulley structure illustrated in Japanese Utility Model Publication No. 35421/1977, one of the movable sideplates of the variable pulley is engaged by a coil spring. The opposite ends of the coil spring are bent and retained at one end in a recess provided in the movable sideplates and at the other end in a part of the shaft. Rotation of the pulley in use of the drive urges the coil spring in a winding direction. Repeated rotational pulses applied to the spring as a result of torque variations in the operation of the drive system have often resulted in breaking of the spring, particularly at the connections to the sideplate and shaft.

SUMMARY OF THE INVENTION

The present invention comprehends an improved variable pulley structure which eliminates the serious disadvantages of the prior art structures as discussed above in a novel and simple manner.

More specifically, the invention comprehends the provision of a variable pulley structure wherein at least one of the two sideplates is free to move axially and rotatively on the shaft.

A coil spring is coaxially mounted about the shaft with one end engaging the movable sideplate and the opposite end engaging a spring retainer fixedly carried by the shaft.

In one form, the opposite ends of the spring are retained in association with the sideplate and spring retainer by having the ends thereof received in suitable grooves provided in the sideplate and retainer.

In another form, the ends of the spring are retained by means of a shoulder projection on the sideplate and retainer engaging the distal ends of the spring.

The coil spring may be made of a suitable springy element having a suitable cross section, such as round or polyhedral, and in the illustrated embodiments, in one form, the spring has a circular cross section, and in a second form, has a square cross section.

The grooves receiving the ends of the spring may be tapered and, in the illustrated embodiment, have a preselected maximum depth.

The movable sideplates may be provided with suitable low friction bushings for facilitating the movement thereof on the shaft.

In one form, the movable sideplate is provided with a cast iron inner portion engaging the shaft for improved low friction, low wear mounting.

The shaft may be caused to be wear resistant in the portion thereof supporting the movable sideplate. In the illustrated embodiment, in one form, the shaft is induction-hardened, and in another form, is provided with a wear resistant layer formed of a suitable material, such as chromium.

The variable pulley structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a diametric section of a variable pulley system embodying the invention;

FIG. 2 is a transverse section taken along the line 2—2 of FIG. 1;

FIG. 3 is a transverse section taken substantially along the line 3—3 of FIG. 1;

FIG. 4a is a radial section taken substantially along the line 4a-4a of FIG. 2;

FIG. 4b is a radial section taken substantially along the line 4b-4b of FIG. 2;

FIG. 4c is a radial section taken substantially along the line 4c-4c of FIG. 2;

FIG. 5 is a schematic illustration of the spring arrangement of FIG. 1;

FIG. 6 is a diametric section of a modified form of variable pulley system embodying the invention;

FIG. 7 is a schematic illustration of the spring arrangement of the embodiment of FIG. 6;

FIG. 8 is a diametric section of still another form of variable pulley system embodying the invention;

FIG. 9 is a diametric section of yet another form of variable pulley system embodying the invention;

FIG. 10 is a diametric section of still another embodiment of variable pulley system embodying the invention;

FIG. 11 is a schematic diagram illustrating the spring arrangement of the embodiment of FIG. 10;

DESCRIPTION OF THE PREFERRED EMBODIMENTS

Figure 12A:
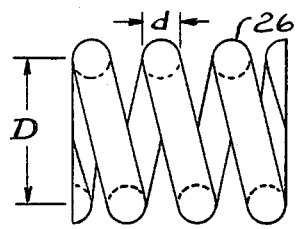
FIG. 12a is a fragmentary elevation of a round spring as employed in certain of the embodiments of the invention.

In the exemplary embodiments of the invention as disclosed in the drawing, a number of different variable pulley structures are shown for use with a V-belt generally designated 10 as for use in transmitting power at variable speed ratios. In one embodiment, the variable pulley structure generally designated 11, as shown in FIG. 1, includes a first sideplate element 12 defining a first frustoconical belt-engaging surface 13, and a second sideplate element 14 defining a second frustoconical belt-engaging surface 15. As will be obvious to those skilled in the art, by adjusting the spacing between belt surfaces 13 and 15, the belt 10 will ride between the belt surfaces at different radial distances from the axis 16 of the shaft 17 on which the sideplate elements are mounted so as to provide a variable ratio power transmission.

In variable pulley structure 11, the first sideplate element 12 is fixedly secured to the shaft by a suitable screw 18 extending through a hub portion 19 of the element and engaging the shaft.

Sideplate element 14, however, is movably mounted on shaft 17 for both axial and rotational movement relative to the shaft. Thus, sideplate element 14 defines a hub portion 20 which is slidably carried on the shaft. To provide reduced friction and wear between the hub portion 20 and shaft, either or both of the hub portion 20 and shaft portion on which the hub portion rides may be formed of cast iron, or a suitable low seizure material. Alternatively, the portion 21 of shaft 17 on which the hub portion 20 is mounted may be made to be wear resistant as by suitable hardening. Illustratively, the portion 21 may be hardened by inductive heating. Alternatively, the shaft portion 21 may be provided with a suitable wear resistant low friction surface layer or coating. Illustratively, the surface may be chromium plated.

A spring retainer 22 is fixedly mounted to the shaft adjacent second sideplate element 14 as by a suitable screw 23. Sideplate element 14 and retainer 22 define confronting radial surfaces 24 and 25, respectively, between which a coil spring 26 is retained for biasing or urging the sideplate element 14 toward sideplate element 12. In the embodiment of FIG. 1, spring 26 is formed of an elongated element, such as a springy wire, having a curved cross section, and more specifically, as seen in FIG. 1, a circular cross section. The opposite ends of the spring are received in complementary arcuate grooves, including groove 27 in retainer face 25 and groove 28 in sideplate element face 24. Thus, groove 27 receives end 29 of spring 26 and groove 28 receives the opposite end 30 of the spring.

Each of the crescent-shaped grooves is tapered, as seen in FIGS. 2 and 3, in depth so that at the small end thereof, the groove has a depth of one-sixth or more of the diameter of the spring end. The radial width of the grooves may vary correspondingly.

As seen in FIGS. 2 and 3, the tapered grooves extend in opposite directions so as to urge the spring in an unwinding direction as a result of urging of the sideplate element 14 in the direction of the arrow 31, as seen in FIG. 2, by drive forces transmitted thereto by the belt 10 in operation of the system. It has been found that by maintaining the shallowest depth of the tapered groove at least one-sixth of the diameter of the spring wire, a positive engagement of the spring ends is effectively maintained. The decrease in the depth and width of the respective grooves is illustrated in FIGS. 4a, 4b and 4c, and FIG. 5.

As illustrated in FIG. 6, a modified form of variable pulley structure generally designated 111 is shown to comprise a structure similar to structure 11 but wherein the opposite ends of the spring 126 are retained by abutment thereof with a projecting shoulder 131 on spring retainer 122 and a corresponding projecting shoulder 132 on sideplate element 114. As shown in FIG. 6, the retainer 131 defines a cylindrical surface 133 coaxially receiving the end 129 of spring 126, and sideplate element 114 defines a cylindrical surface 134 coaxially receiving the opposite end 130 of the spring. Thus, in the embodiment of FIG. 6, the spring 126 is effectively retained in biasing relationship with the sideplate element 114 by its simple abutment with the shoulders 131 and 132, respectively, so that the spring again is urged in the unwinding direction by the forces transmitted from the belt and to the movable sideplate element 114 during operation of the drive system. In all other respects, the variable pulley structure 111 is similar to variable pulley structure 11 of the first described embodiment.

The abutment of the spring ends 129 and 130 with the stop shoulders 131 and 132, respectively, is illustrated in FIG. 7.

The improved variable pulley structure described above is advantageously adapted for use in power transmission systems wherein variable speed is desired. The effective diameter of the variable pulley structure may be readily changed by adjusting the tension of the belt 10. The elimination of the need for splines, or keyways, has provided a long, troublefree life structure by eliminating undesirable stresses in the system. As a result of the unwinding of the biasing spring as a function of torque increases, an improved torque-transmitting means is provided.

Figure 16:
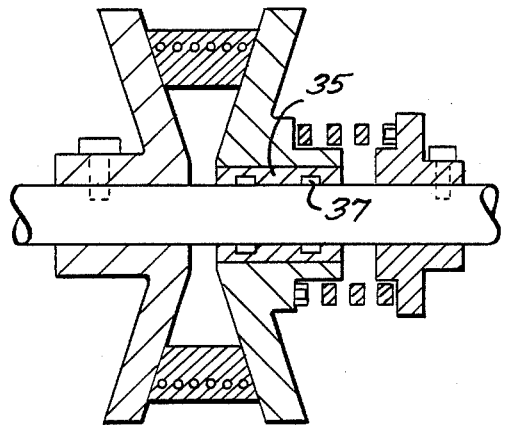
FIG. 16 is a diametric section of yet another form of variable pulley system embodying the invention.

The use of low friction, wear resistant contact surfaces between the movable sideplate element and the shaft provides long, troublefree life. Alternatively, as shown in FIG. 16, the movable sideplate element may be movably mounted to the shaft as by a suitable sleeve bushing 35 to provide further low friction sliding engagement, hub portion 20 of the sideplate element may be provided with suitable oil grooves 36, as seen in FIG. 1, and alternatively, the bushing 35, as seen in FIG. 16, may be provided with suitable oil grooves 37.

In the above discussed embodiments, only one of the sideplate elements is movably mounted to the shaft. The invention, however, further comprehends the movable mounting of both of the sideplate elements. Thus, in the variable pulley structure generally designated 211 illustrated in FIG. 8, each of the sideplate elements 212 and 214 is movably mounted to the shaft 217 in a manner similar to the mounting of the movable sideplate element 14 to the shaft in the variable pulley structure 11 illustrated in FIG. 1. Similarly, in FIG. 9, the variable pulley structure generally designated 311 is shown to comprise a structure similar to structure 211 in having each of the sideplate elements movably mounted to the shaft but utilizing projecting stop shoulders in retaining the ends of the springs in a manner similar to that of the variable pulley structure 111 illustrated in FIG. 6.

Referring now to FIG. 10, a further modified form of variable pulley structure generally designated 411 is shown to comprise a variable pulley structure similar to pulley structure 11 but wherein the spring 426 is formed of a spring element having a polyhedral cross section. In the illustrated embodiment, the cross section is rectangular. The abutment of the ends of the rectangular spring with the stop shoulders 431 and 432 is illustrated in FIG. 11.

Figure 13:
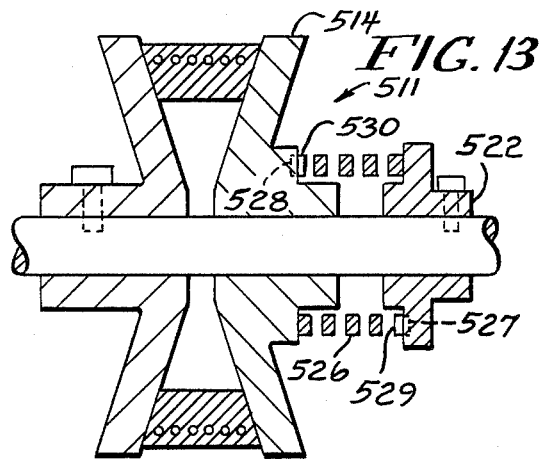
FIG. 13 is a diametric section of another form of variable pulley system embodying the invention.

Referring to FIG. 13, a modified form of variable pulley structure generally designated 511 is shown to comprise a structure similar to pulley structure 411 in utilizing a spring having a polyhedral cross section, but wherein the ends of the spring are received in crescent tapered grooves 527 and 528, respectively, in the spring retainer 522 and movable sideplate element 514. As shown, the grooves have a polyhedral cross section which tapers in width and depth similarly to the taper of the round grooves 28 and 29 of variable pulley structure 11.

Figure 14:
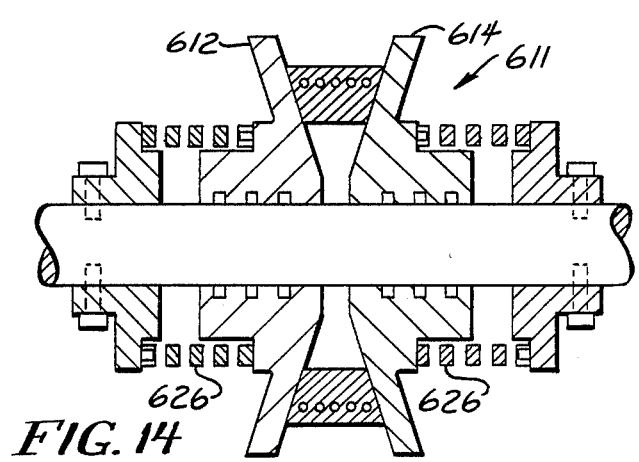
FIG. 14 is a diametric section of yet another form of variable pulley system embodying the invention.

The variable pulley structure 611 of FIG. 14 is similar to variable pulley structure 411 of FIG. 10, but utilizes the movable sideplate element structure for each of the sideplates 612 and 614.

Figure 15:
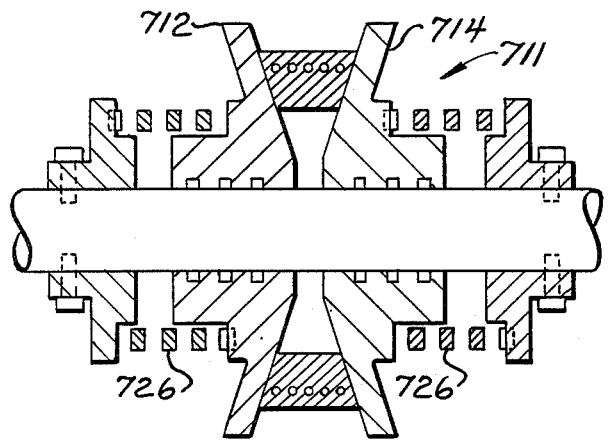
FIG. 15 is a diametric section of another form of variable pulley system embodying the invention.

The variable pulley structure 711 of FIG. 15 is similar to the variable pulley structure 511 of FIG. 13, but utilizes the movable sideplate means for each of the sideplate means of structure 511 for each of the sideplates 712 and 714.

Figure 17:
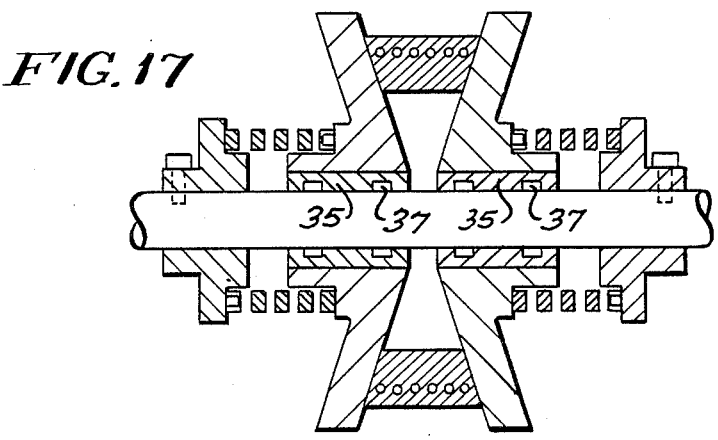
FIG. 17 is a diametric section of a still further form of variable pulley system embodying the invention.

FIG. 17 illustrates a pulley structure similar to that of FIG. 16, but utilizing a pair of springs and spring retainers and a corresponding pair of sleeve bushings 35 having oil grooves 37.

The use of the rectangular cross section spring provides an improvement in transmission efficiency, especially under severe load conditions. Thus, the square spring embodiments provide a smaller angle of torsion resulting from the torque on the spring effected by the forcible urging of the movable sideplate in the operation of the pulley structure, as compared with the angle of torsion produced with a spring having a round cross section, such as the circular cross section of the variable pulley structure 11.

Figure 12B:
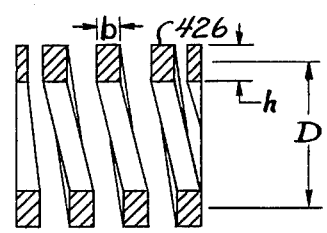
FIG. 12b is a diametric section of a square wire spring as employed in other embodiments of the invention.

More specifically, with reference to the spring illustrations of FIGS. 12a and 12b, the improved torsional rigidity of the square spring relative to the round spring may be seen by letting D denote the effective diameter of the spring, d denote wire diameter of the round spring, h and b denote the radial dimension and axial dimension respectively of the rectangular spring, and $K_1$ and $K_2$ denote spring constants (kg/mm) of the round spring and square spring respectively.

It follows that:

$$K_1 = \frac{W_1}{\delta_1} = \frac{Gd^4}{8ND^3} \quad (1)$$

$$K_2 = \frac{W_2}{\delta_2} = \frac{4k_2 G h b^3}{\pi ND^3} \quad (2)$$

where:
$\delta_1$ = compressive deflection of the round spring
$\delta_2$ = compressive deflection of the square spring
$W_1$ = compressive load (kg) on the round spring
$W_2$ = compressive load (kg) on the square spring
N = number of turns of the spring
G = modulus of elasticity in shear (kg/mm$^2$)
$k_2$ = constant determined from h/b Letting $S_1$ and $S_2$ represent the torsional rigidity (kg-mm/radian) of the round spring and the square spring, respectively, then $$S_1 = \frac{M_1}{\phi_1} = \frac{Ed^4}{64ND} \quad (3)$$

$$S_2 = \frac{M_2}{\phi_2} = \frac{Ebh^3}{12\pi ND} \quad (4)$$

where:
$M_1$ = torque (kg/mm) of the round spring
$M_2$ = torque (kg/mm) of the square spring
$\phi_1$ = angle of torsion (radian) of the round spring
$\phi_2$ = angle of torsion (radian) of the square spring
E = modulus of longitudinal elasticity (kg/mm$^2$)

When a round and a square spring defined above are used as the spring in a variable pulley, and if the two springs are the same in free length and in effective diameter of spring and under the same spring constant, that is, $$k_1 = k_2 \quad (5)$$

then, from Eqs. (1), (2) and (5), $$d^4 = 32 k_1 h b^3 / \pi \quad (6)$$

When the round spring and the square spring are under the same conditions expressed in Eq. (5), the ratio of torsional rigidity R is given as $$R = S_1/S_2 \quad (7)$$

and, by substitution of Eqs. (4) and (7), becomes $$R = S_1/S_2 = \frac{Ed^4}{64DN} \cdot \frac{12\pi DN}{Ebh^3} = \frac{3\pi d^4}{16bh^3} \quad (8)$$

which, from Eqs. (6) and (8), results in $$R = S_1/S_2 = \frac{6k_2 b^2}{h^2} \quad (9)$$

It should be noted that with the present winding techniques for coiling a square spring, the value of b/h must be a minimum of about 0.54.

Substituting the presently technically minimum value of b/h = 0.54 into Eq. (9) (the constant $k_2$ is 0.22 under this condition), so that $$R = 6 \times 0.22 \times 0.54^2 \div 0.385 = \frac{1}{2.6}$$

The last equation indicates that a square spring is 2.6 times as torsionally rigid as a round spring when the two springs are the same in spring constant, effective diameter, and free length. That is, under the same torsional stress, the angle of torsion of the square spring is $\frac{1}{2}$.6 of that of the round spring. Thus, as compared with the round spring, the square spring develops a smaller angle of torsion and withstands a heavier load, indicating a greater torsional rigidity.

As indicated above, the invention comprehends the provision of suitable means for providing reduced friction and wear between the movable sideplate elements and the shaft. Such may be effected by suitably treating the surface of the shaft on which the sideplate element is mounted so as to provide a hardened surface as by high frequency induction heating, nitriding, chromium plating, etc. As indicated, the mounting may be effected by use of a suitable bushing and lubrication may be provided by means of oil grooves, as desired.

By arranging the spring so that increased torque developed by the belt in the movable sideplate element causes an unwinding of the spring, failure of the springs is effectively minimized. Further, by such unwinding action, the friction between the movable sideplate element and shaft is effectively reduced whereby heating is similarly reduced and the variable pulley structure has the substantialy increased useful life. Further, such reduction in friction provides increased energy efficiency in the operation of the drive. Where relatively heavy loads are anticipated, the use of the rectangular cross section spring provides further improved efficiency and troublefree life.

As shown in the drawing as originally filed, the invention comprehends improved means for resiliently urging the coaxial halves of a variable pulley, such as variable pulley 11 or variable pulley 111, toward each other as a function of the torque developed in the drive system. As illustrated in FIGS. 1-5, a first shoulder is provided on the pulley half 14 which faces in a first circumferential direction from a radial plane defined by the ais of the coaxial pulley halves 12 and 14. A second shoulder is fixedly associated with the other half of the pulley by virtue of the spring support 22 being secured to the shaft 17 and, thus, in turn, to the pulley half 12. The shoulder affixedly associated with the other half 12 of the pulley faces in the opposite circumferential direction from a radial plane defined by the pulley axis. The coil spring 26 extends coaxially between the pulley halves and has one end endwise abutting the first shoulder and an opposite end endwise abutting the second shoulder. The direction of facing of the shoulder, as previously pointed out is preselected so that the spring is urged in the unwinding direction as a result of an increased torque. Further, as shown in FIGS. 1-5, the structure is free of any impediment radially outwardly of spring 26 so as to permit free variation in the diameter thereof in the unwinding and winding of the spring during operation of the drive.

Essentially the same arrangement is shown diagrammatically in FIGS. 7 and 11, except that the stop shoulders are defined by projections on the respective elements, rather than the ends of grooves provided herein. Thus, in FIG. 7, the stop shoulders are provided by elements 131 and 132 and, in FIG. 11, the stop shoulders are provided by the elements 431 and 432. Similar illustrations of the unique arrangement of the stop shoulders and abutting ends of the spring are illustrated in connection with the other embodiments.

As the spring extends helically and the opposite ends thereof endwise abut the radial shoulders, as will be obvious to those skilled in the art, the abutment surfaces are helically opposed so as to provide the desirable unwinding of the spring as a result of the increased torque transmission.

As seen in FIGS. 7, 9, 10, 11, 14, 16 and 17, the helically opposite end faces of the springs have a transverse dimension perpendicular to the projection extent of the projecting shoulder means on the spring retainers and sideplates greater than the corresponding dimension of the shoulder means.

The foregoing disclosure of specific embodiments is illustrative of the broad inventive concepts comprehended by the invention.

I claim:

1. A variable pulley arranged to be mounted to a shaft, comprising:

a first sideplate element defining a first frustoconical belt-engaging surface;

means for mounting said first sideplate element fixedly coaxially to the shaft;

a second sideplate element defining a second frustoconical belt-engaging surface;

means for mounting said second sideplate element rotatably and axially movably, coaxially on the shaft with said second belt-engaging surface confronting said first belt-engaging surface for force transfer engagement with inclined edge surfaces of a V-belt extending longitudinally about the shaft therebetween;

spring retainer means;

a coil spring having opposite transverse end faces;

first projecting shoulder means on said second sideplate element; and second projecting shoulder means on said spring retainer means, said shoulder means defining helically opposed abutment surfaces, said spring being resiliently compressed between said shoulder means with said spring end faces being resiliently urged into facial abutment with said abutment surfaces and with said spring extending coaxially of the shaft, the winding direction of the spring being preselected such that the spring is urged in the unwinding direction by torque developed in said second sideplate element by the V-belt in normal drive operation, the pulley structure being free of restraint radially outwardly of the spring to permit free radial expansion of the spring as an incident of an increase in said torque.

2. A variable pulley arranged to be mounted to a shaft, comprising:

a first sideplate element defining a first frustoconical belt-engaging surface;

a second sideplate element defining a second frustoconical belt-engaging surface;

means for mounting each of said sideplate elements rotatably and axially movably, coaxially on the shaft with said belt-engaging surfaces confronting each other for force transfer engagement with inclined edge surfaces of a V-belt extending longitudinally about the shaft therebetween;

first and second spring retainer means;

first and second coil springs, each coil spring having opposite transverse end faces;

means for mounting the first spring retainer means to the shaft;

first projecting shoulder means on said first sideplate element;

second projecting shoulder means on said first spring retainer means, said first shoulder means defining helically opposed abutment surfaces, said first spring being resiliently compressed between said first and second shoulder means with said first spring end faces being resiliently urged into facial abutment with said abutment surfaces and with said first spring extending coaxially of the shaft between said first sideplate element and said first spring retainer means, the winding direction of said first spring being preselected such that said first spring is urged in the unwinding direction by torque developed to said first sideplate element by the V-belt in normal drive operation, the pulley structure being free of restraint radially outwardly of said first spring to permit free radial expansion of the spring as an incident of an increase in said torque;

means for mounting the second spring retainer means to the shaft;

third projecting shoulder means on said second sideplate element; and fourth projecting shoulder means on said second spring retainer means, said third and fourth shoulder means defining helically opposed abutment surfaces, said second spring being resiliently compressed between said third and fourth shoulders with said second spring end faces being resiliently urged into facial abutment with said third and fourth shoulder means abutment surfaces and with said second spring extending coaxially of the shaft between said second sideplate element and said second spring being preselected such that said second spring is also urged in the unwinding direction by torque developed in said second sideplate element by the V-belt in normal drive operation, the pulley structure being free of restraint radially outwardly of said second spring to permit free radial expansion thereof as an incident of such an increase in said torque.

3. The variable pulley of claims 1 or 2 wherein each said spring end face has a transverse dimension perpendicular to the projection extent of the shoulder means greater than the corresponding dimension of the shoulder means.

4. A variable pulley arranged to be mounted to a shaft, comprising:

a first sideplate element defining a first frustoconical belt-engaging surface;

means for mounting said first sideplate element fixedly coaxially to the shaft;

a second sideplate element defining a second frustoconical belt-engaging surface;

means for mounting said second sideplate element rotatably and axially movably, coaxially on the shaft with said second belt-engaging surface confronting said first belt-engaging surface for force transfer engagement with inclined edge surfaces of a V-belt exteing longitudinally about the shaft therebetween;

spring retainer means;

a coil spring having opposite transverse end faces;

means for mounting the spring retainer means to the shaft;

first recessed shoulder means on said second sideplate element; and second recessed shoulder means on said spring retainer means, said shoulder means defining helically opposed abutment surfaces, said spring being resiliently compressed between said shoulder means with said spring end faces being resiliently urged into facial abutment with said abutment surfaces and with said spring extending coaxially of the shaft, the winding direction of the spring being preselected such that the spring is urged in the unwinding direction by torque developed in said second sideplate element by the V-belt in normal drive operation, each said spring defining end portions and each sideplate element and spring retainer being provided with a groove for retaining said end portions respectively in fixed association therewith.

5. The variable pulley of claim 2 wherein each sideplate element and spring retainer is provided with a groove for retaining said end portions respectively in fixed association therewith, each said groove having a width equal to the radial width of the spring end portion received therein.

6. The variable pulley of claim 2 wherein each said groove has a width equal to the radial width of the spring end portion received therein and a maximum depth in the range of the axial width to one-sixth the axial width of the spring end portion received therein.

7. The variable pulley of claims 1, 2 or 4 wherein each said spring is formed of an elongated element having a round cross section.

8. The variable pulley of claims 1, 2 or 4 wherein each said spring is formed of an elongated element having a polyhedral cross section.

9. The variable pulley of claims 1, 2 or 4 wherein each sideplate element arranged to be movably mounted to the shaft is provided with a cast iron radially inner portion for wear resistant engagement of the shaft.

10. The variable pulley of claims 1, 2 or 4 wherein a sleeve bushing is provided in each movably mounted sideplate element for movable mounting to the shaft.

11. The variable pulley of claims 1, 2 or 4 further including a shaft having a hardened surface in the portion thereof to which each movably mounted sideplate element is mounted.

12. The variable pulley of claims 1, 2 or 4 further including a shaft having a hard deposited layer defining a hard surface in the portion thereof to which each movably mounted sideplate element is mounted.

13. The variable pulley of claim 4 wherein said recessed shoulder means are defined by an end of curved, tapered grooves provided one each in each said sideplate element and spring retainer.

14. Means for resiliently urging toward each other coaxial halves of a variable pulley, comprising:

a first shoulder on one half of the pulley facing in a first circumferential direction about the axis of the pulley half from a radial plane defined by said axis;

a second shoulder on the other half of the pulley facing in the opposite circumferential direction from a radial plane defined by said axis; and a coil spring extending coaxially between said pulley halves and having one end endwise abutting said first shoulder and an opposite end endwise abutting said second shoulder to have free radial expansion radially of said axis as an incident of an increase in torque between the pulley halves.

* * * * *